United States Patent
Ota

[11] Patent Number: 5,992,642
[45] Date of Patent: Nov. 30, 1999

[54] FILTERING APPARATUS AND FILTERING SYSTEM

[75] Inventor: Seizo Ota, Ichihara, Japan

[73] Assignee: Kabushiki Kaisha Syst, Chiba-Ken, Japan

[21] Appl. No.: 08/846,841

[22] Filed: May 1, 1997

[30] Foreign Application Priority Data

May 17, 1996 [JP] Japan ................................ 8-123801

[51] Int. Cl.⁶ .................................................. B01D 33/06
[52] U.S. Cl. ......................... 210/396; 210/394; 210/400; 210/402; 210/433.1; 210/526
[58] Field of Search .................. 210/394, 396, 210/400, 402, 433.1, 526

[56] References Cited

U.S. PATENT DOCUMENTS

| | | |
|---|---|---|
| 1,627,550 | 5/1927 | Bachmann . |
| 1,904,066 | 4/1933 | McArthur . |
| 2,267,086 | 12/1941 | Donohue ................................ 210/199 |
| 2,969,880 | 1/1961 | Lundholm et al. ..................... 210/393 |
| 4,655,940 | 4/1987 | Harms ..................................... 210/805 |
| 4,724,077 | 2/1988 | Uchiyama ............................... 210/394 |
| 4,895,647 | 1/1990 | Uchiyama ............................... 210/171 |
| 4,992,167 | 2/1991 | Uchiyama ............................... 210/171 |
| 5,167,839 | 12/1992 | Widmer, II et al. . |
| 5,230,793 | 7/1993 | Lenhart et al. ......................... 210/167 |
| 5,310,046 | 5/1994 | Palmaer et al. ......................... 198/831 |

FOREIGN PATENT DOCUMENTS

| | | |
|---|---|---|
| 47-25878 | 10/1972 | Japan . |
| 52-92475 | 7/1977 | Japan . |
| 59-55645 | 4/1984 | Japan . |
| 59-158418 | 10/1984 | Japan . |
| 2-125711 | 10/1990 | Japan . |
| 5-22007 | 3/1993 | Japan . |
| 5-293312 | 11/1993 | Japan . |
| 7-20234 | 4/1995 | Japan . |
| 07227507 | 8/1995 | Japan . |
| 7-204427 | 8/1995 | Japan . |
| 8-215512 | 8/1996 | Japan . |
| 281220 | 12/1970 | U.S.S.R. . |

Primary Examiner—Jay H. Woo
Assistant Examiner—Betsey J. Morrison
Attorney, Agent, or Firm—Merchant & Gould, P.C.

[57] ABSTRACT

A filtering apparatus and filtering system where a hinge belt 10 of a hinge-belt type filtering apparatus 100 is continuously rotated by driving of a drive motor 65 such that hinge scrapers are rotated along a bottom plate 6b of the hinge filtering apparatus main body, from a horizontal part to a slope part of the hinge filtering apparatus main body.

43 Claims, 14 Drawing Sheets

FILTERING APPARATUS AND FILTERING SYSTEM

BACKGROUND OF THE INVENTION

This invention relates to a filtering apparatus and a filtering system and, more particularly to a filtering apparatus which cleans cutting oil used as coolant in a metal cutting process by a machining center such as a lathe or a milling machine, by separating curled cuttings from the cutting oil with a conveyor having a hinge belt, and a filtering system which enables recycling of the cutting oil by fine filtration, with a combination of the hinge-belt type filtering apparatus and a filtering apparatus using a drum filter.

DESCRIPTION OF RELATED ART

Conventionally, to reuse cutting oil containing cuttings, used as coolant in a metal cutting process, (hereinafter this type of cutting oil will be referred to as "dirty liquid"), a number of filtering apparatuses have been proposed to obtain reusable cutting oil (hereinafter referred to as "clean liquid") by filtering the dirty liquid to separate cuttings from oil.

On the other hand, the cuttings, contained in the used cutting oil (dirty liquid), mainly include curled cuttings, lumps of curled cuttings (hereinafter referred to as "dumpling cuttings"), and relatively fine cuttings (hereinafter referred to as "sludge") other than the curled cuttings and dumpling cuttings.

Among the conventional filtering apparatuses, a hinge-belt conveyor type filtering apparatus is known for its filtering function especially suitable to filter relatively large curled cuttings and dumpling cuttings. FIG. 6 shows this hinge-belt conveyor type filtering apparatus. In FIG. 6, a filtering apparatus 100' has a hinge belt 10', formed by connecting a plurality of metal plates with hinges into an endless caterpillar-type belt, and scrapers 20' provided on the outer surface of the hinge belt 10' at predetermined intervals. The hinge belt 10' is rolled around tail-side sprockets 50' and top-side sprockets 60' and turned as a belt conveyor. Used cutting oil, i.e., dirty liquid is poured from a dirty-liquid inlet port 30' at an upper portion of the filtering apparatus main body. Then only cutting oil is passed between the metal plates of the hinge belt, and the filtered clean liquid is taken out from a clean-liquid outlet port 40'. On the other hand, the curled cuttings and dumpling cuttings, which have not passed between the metal plates and remained on the metal plates, are conveyed by the hinge belt 10' and the scrapers 20' in a conveyance direction D3, and dropped from a cuttings outlet port 4', provided at a lower portion of the top-side sprocket 60', into a cuttings reservoir 80'. Further, curled cuttings and dumpling cuttings, attached to the surface of the metal plates and the like, or sludge passed between the metal plates, are conveyed between the metal plates and a bottom plate 6b', swept by the scrapers 20' from a tail cover 5' to the upper part of the apparatus, and again conveyed on the metal plates.

Further, a drum-filter type filtering apparatus is known for its filtering function suitable to filter sludge.

Japanese Patent Application Laid-Open No. 7-227507 discloses a drum-filter type filtering apparatus which obtains cleaned cutting oil by separating cuttings from used cutting oil. The filtering apparatus has a cleaned-oil reservoir, a cutting-oil reservoir for temporarily reserving dirty cutting oil poured from an inlet port, a seal member which is rotatably floated, and a filtering drum, having filtering means on the circumferential surface and a side opening to discharge filtered oil into the cleaned oil reservoir, on at least one end surface, injection means for inverse-cleaning the filtering means, and pump means, provided at predetermined intervals, for continuously conveying cuttings from the upstream to the downstream of the inlet port and dropping the conveyed cuttings from a cuttings outlet port.

U.S. Pat. No. 5,167,839 discloses a filtering system having the hinge-belt conveyor type filtering apparatus and drum-filter type filtering apparatus, which filters curled cuttings, dumpling cuttings and sludge off at once.

The hinge-belt conveyor type filtering apparatus is mainly suitable for rough filtration of relatively large cuttings such as curled cuttings and dumpling cuttings, however, it is not suitable for fine filtration of fine cuttings such as sludge. That is, as shown in FIG. 6, in the hinge-belt type filtering apparatus, an interval t1 between a top plate 6a' and the hinge belt 10' is wide so as to convey curled cuttings, dumpling cuttings and the like on the hinge belt 10' upward, while an interval t2 between the bottom plate 6b' and the hinge belt 10' is narrow (e.g., about 50 mm) so as to sweep sludge which remains on the bottom plate 6b' by the scrapers 20'. In long-hours use, sludge is accumulated between the bottom plate 6b' or the tail cover 5' and the hinge belt 10', this may stop rotation of the tail-side sprocket. For this reason, this apparatus requires periodic cleaning. Further, when the cuttings are dropped from the cuttings outlet port 4', cutting oil, attached to the hinge belt 10' located above the cuttings outlet port 4', drops into the cuttings reservoir 80', and cuttings and cutting oil are mixed there, this causes trouble in handling the cuttings in the cuttings reservoir 80'.

The drum-filter type filtering apparatus is suitable to fine filtration of sludge but not suitable to filtration of curled cuttings and dumpling cuttings. That is, curled cuttings and dumpling cuttings are caught by a chain for driving the drum filter, which may break the chain or a filtering element such as a stainless-steel net and a chemical fiber mesh.

In the filtering apparatus disclosed in U.S. Pat. No. 5,167,839, the drum filter is provided on the hinge belt, and is protected by a protection member 33 from curled cuttings, dumpling cuttings and the like. However, as the surface of cutting oil is at a higher level than the protection member 33, there is a possibility that curled cuttings and dumpling cuttings float into the drum filter. Further, this system is not designed to perform fine filtration on cutting oil including sludge after rough filtration of curled cuttings and the like by the hinge belt, therefore, the rough filtration by the hinge belt is not fully utilized.

As shown in FIG. 13, in a filtering system where a hinge-belt conveyor type filtering apparatus 100' and a drum-filter type filtering apparatus 200' are simply combined, dirty liquid poured from the dirty-liquid inlet port 30' is roughly filtered by the hinge belt 10', and forwarded into the drum-filter type filtering apparatus 200', where the dirty liquid is subjected to fine filtration by a drum filter 230'. However, since the rotating directions of the filtering apparatuses 100' and 200' are different, it is necessary to provide filtering apparatuses 100' and 200' with bearings 261' and a drive mechanism 265'. Further, it is necessary to connect the filtering apparatuses 100' and 200' on a base tray 101', and provide a primary clean-liquid path 150' to forward primary clean liquid after rough filtration to the drum filter 230'. This increases the overall system size and cost.

SUMMARY OF THE INVENTION

The present invention has been made in consideration of the drawbacks of the prior art, and has its object to provide a filtering apparatus and a filtering system which eliminates periodical cleaning of the apparatus and enables a long-hour operatorless driving.

Another object of the present invention is to provide a filtering apparatus and a filtering system which simultaneously performs rough filtration of curled cuttings and fine filtration of sludge without damaging filtering elements, performs filtration in accordance with various cutting conditions of a machining center, and enables a long-hour operatorless driving by virtue of its maintenance-free filtering operation.

Further, another object of the present invention is to provide a filtering system which reduces cost by rotating a hinge belt and a drum filter in the same rotation direction so as to use a common drive mechanism.

Further, another object of the present invention is to provide a filtering apparatus and a filtering system where a hinge-belt conveyor type filtering apparatus and a drum-filter type filtering apparatus are effectively integrated. The apparatus and system enables efficient filtering by rough filtration of curled cuttings by the hinge belt and subsequent fine filtration of sludge, thus satisfactory following the high-speed process of recent machining centers.

According to the present invention, the foregoing objects are attained by providing a filtering apparatus for filtering used coolant containing wastes such as metal cuttings so as to separate the wastes from the coolant and reuse the separated coolant, comprising: a filtering apparatus main body having a first opening in which the used coolant is poured and a second opening from which the wastes are discharged; a conveyor rotatably provided in the filtering apparatus main body, which filters the used coolant poured from the first opening; a plurality of scrapers provided on the conveyor at predetermined intervals, which sweep the wastes; and drive means for rotating the conveyor so as to convey wastes placed on the conveyor and wastes settled on a bottom surface of the filtering apparatus main body to the second opening, while sweeping the wastes between the bottom surface and the outer surface of the conveyor.

Further, the foregoing objects are attained by providing a filtering system for filtering used coolant containing wastes such as metal cuttings so as to separate the wastes from the coolant and reuse the separated coolant, comprising: 1) a first filtering apparatus having: a first filtering apparatus main body having a first opening in which the used coolant is poured and a second opening from which the wastes are discharged; a conveyor rotatably provided in the first filtering apparatus main body, which filters the used coolant poured from the first opening; and a plurality of scrapers provided on the conveyor at predetermined intervals, which sweep the wastes; a second filtering apparatus having: 2) a second filtering apparatus main body having a third opening connected to the first filtering apparatus, in which primary filtered coolant obtained from filtration by the first filtering apparatus is introduced; a hollow drum filter rotatably provided in the second filtering apparatus main body, having a filter which filters the primary filtered coolant introduced from the third opening on a circumferential surface of the drum filter, and having a opening from which the coolant filtered by the filter is discharged as secondary filtered coolant on at least one side surface of the drum filter; cleaning means for cleaning the drum filter; and a plurality of drum scrapers provided at predetermined intervals; and 3) drive means, provided to at least one of the first filtering apparatus and the second filtering apparatus, for rotating the conveyor and the drum filter in the same direction.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that in the following embodiments, clean liquid where curled cuttings and dumpling cuttings have been filtered off by a hinge-belt filtering apparatus is referred to as "primary clean liquid", and clean liquid where sludge has been filtered off by a drum-filter type filtering apparatus is referred to as "secondary clean liquid".

First Embodiment

Figure 1:
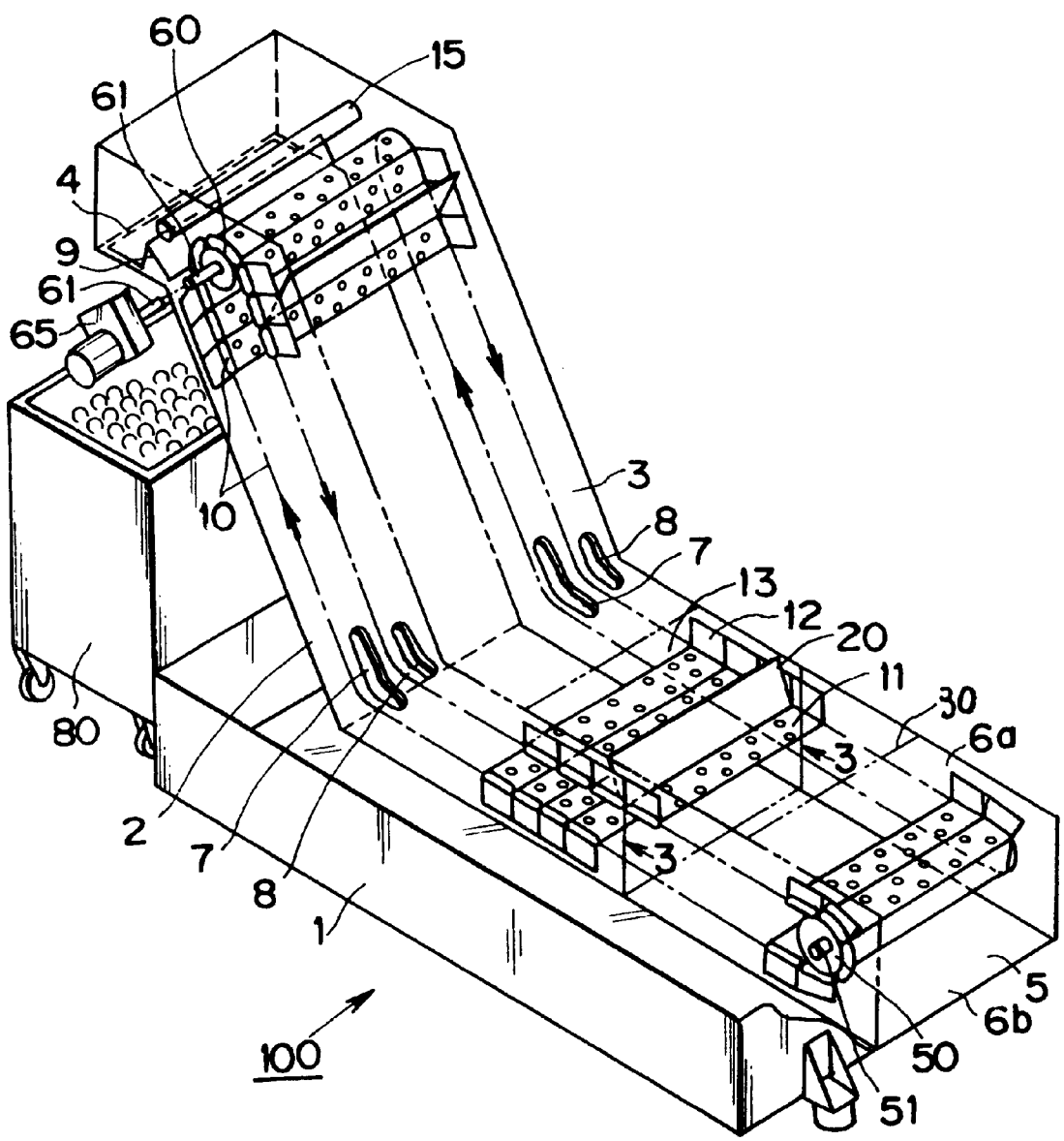
FIG. 1 is a perspective view schematically showing the structure of a filtering apparatus according to a first embodiment of the present invention, in which a cover and the like are removed.

First, a hinge-belt type filtering apparatus (hereinafter referred to as "hinge filtering apparatus") will be described as a first embodiment of the present invention. FIG. 1 is a perspective view schematically showing the structure of the hinge filtering apparatus according to the first embodiment of the present invention, in which a cover and the like are removed.

In FIG. 1, a primary clean-liquid tank 1, having a substantially rectangular-parallelepiped shape, with an opening at the upper end, is a base of a hinge filtering apparatus 100 of the present embodiment. Further, the primary clean-liquid tank 1 has adjustable legs at its four corners for setting the apparatus in parallel to a floor surface of a factory. Primary clean liquid is temporarily stored in the primary clean-liquid tank 1.

A hinge filtering apparatus main body is placed in the primary clean-liquid tank 1. The hinge filtering apparatus main body has a hollow substantially-L rectangular shape, formed by connecting, by welding or the like, each peripheral portion of a left-side wall cover 2, a right-side wall cover 3 (partially represented by an alternate long and two short dashed line), a tail cover 5, a top plate 6a, and a bottom plate 6b. The inside of the hinge filtering apparatus main body has a liquid-tight status from the primary clean-liquid tank 1, i.e., though the hinge filtering apparatus main body is provided in the primary clean-liquid tank 1, the hinge filtering, apparatus main body and the primary clean-liquid tank 1 are separated such that dirty liquid poured into the hinge filtering apparatus and primary clean liquid in the primary clean-liquid tank 1 do not mix. Note the hinge filtering apparatus may be constructed such that the bottom plate 6b of the hinge filtering apparatus main body is also used as the bottom plate of the primary clean-liquid tank 1, thus the filtering apparatus is formed integrally with the primary clean-tank by welding the bottom plate of the primary clean-liquid tank 1, the left-side wall cover 2, the right-side wall-cover 3, the tail cover 5 and the top plate 6a, into a liquid-tight structure.

Constituents of Hinge Filtering Apparatus

Next, the respective constituents of the hinge filtering apparatus in FIG. 1 will be described. The respective elements are attached to the left- and right-side wall covers 2 and 3, thus provided in the hinge filtering apparatus main body.

In FIG. 1, the hinge filtering apparatus main body has a horizontal part set in the primary clean-liquid tank 1, a slope part which extends diagonally upward from the one end of the horizontal part, and a top part which horizontally extends from the top of the slope part. The horizontal part has a dirty-liquid inlet port 30, into which dirty liquid used as coolant in metal cutting process by a machining center (not shown) such as a lathe or a milling machine is poured, on the substantially central portion of the top plate 6a. The horizontal part also has a primary clean-liquid outlet port 40 (See FIG. 2), on the right-side wall cover 3, from which primary clean liquid, where relatively large curled cuttings and dumpling cuttings and the like are filtered off, is discharged into the primary clean-liquid tank 1. More specifically, the primary clean-liquid outlet port 40 is provided between the upper and lower parts of the hinge belt 10 and at a position where sludge tends to be caught, close to the slope part. The top part has a cuttings outlet port 4 (represented by a broken line), between the left- and right-side wall covers 2 and 3, on the bottom surface of the top part. As described later, curled cuttings and dumpling cuttings remaining on the hinge belt 10 are conveyed to the cuttings outlet port 4, and dropped from the cuttings outlet port 4 into a cuttings reservoir 80 which is an exchangeable member provided below the cuttings outlet port 4. Preferably, the slope part has a sufficient height to increase the capacity of the cuttings reservoir 80.

The top part has bearings (not shown) rotatably supporting a top-side shaft 61 on which a pair of left and right top-side sprockets 60 are provided, on the left- and right-side wall covers 2 and 3, at positions close to the slope part. The top-side shaft 61 is fixed on the left-side wall cover 2, and connected to an output shaft of a drive motor 65 integrally having a chain and a sprocket mechanism, thus the top-side shaft 61 can continuously drive the top-side sprockets 60 in a clockwise direction (viewed from the left-side wall cover 2), interlocked with the drive of drive motor 65. The drive motor 65 rotate-drives the hinge belt 10 such that hinge scrapers 20 to be described later are rotated from the horizontal part to the slope part, along the bottom plate 6b of the hinge filtering apparatus main body.

On the other hand, the horizontal part has bearings (not shown), rotatably supporting a tail-side shaft 51 on which a pair of left and right tail-side sprockets 50 are provided, on the left- and right-side wall covers 2 and 3, at positions around the end of the horizontal part.

Between the top-side sprockets 60 and the tail-side sprockets 50, a caterpillar type endless hinge belt 10 (partially represented by an alternate long and short dashed line) is provided, engaged with the top-side sprockets 60 and the tail-side sprockets 50 at respective ends of the filtering apparatus main body. As shown in FIG. 1, an upper conveyor guide 7 and a lower conveyor guide 8 are fixed on the left and right-side wall covers 2 and 3, at positions around the joint between the slope part and the horizontal part, so as to guide the endless hinge belt 10 along the left- and right-side wall covers 2 and 3.

In the hinge filtering apparatus main body, a cuttings remover 15 is provided at a position around the cuttings outlet port 4 and close to an orbital path of a hinge scrapers 20. The cuttings remover 15 may have a round bar shape or other various shapes. Around the cuttings outlet port 4, an oil trap plate 9 for trapping oil dropped from the hinge belt 10 is provided below the cuttings remover 15.

Hinge Belt

Figure 3:
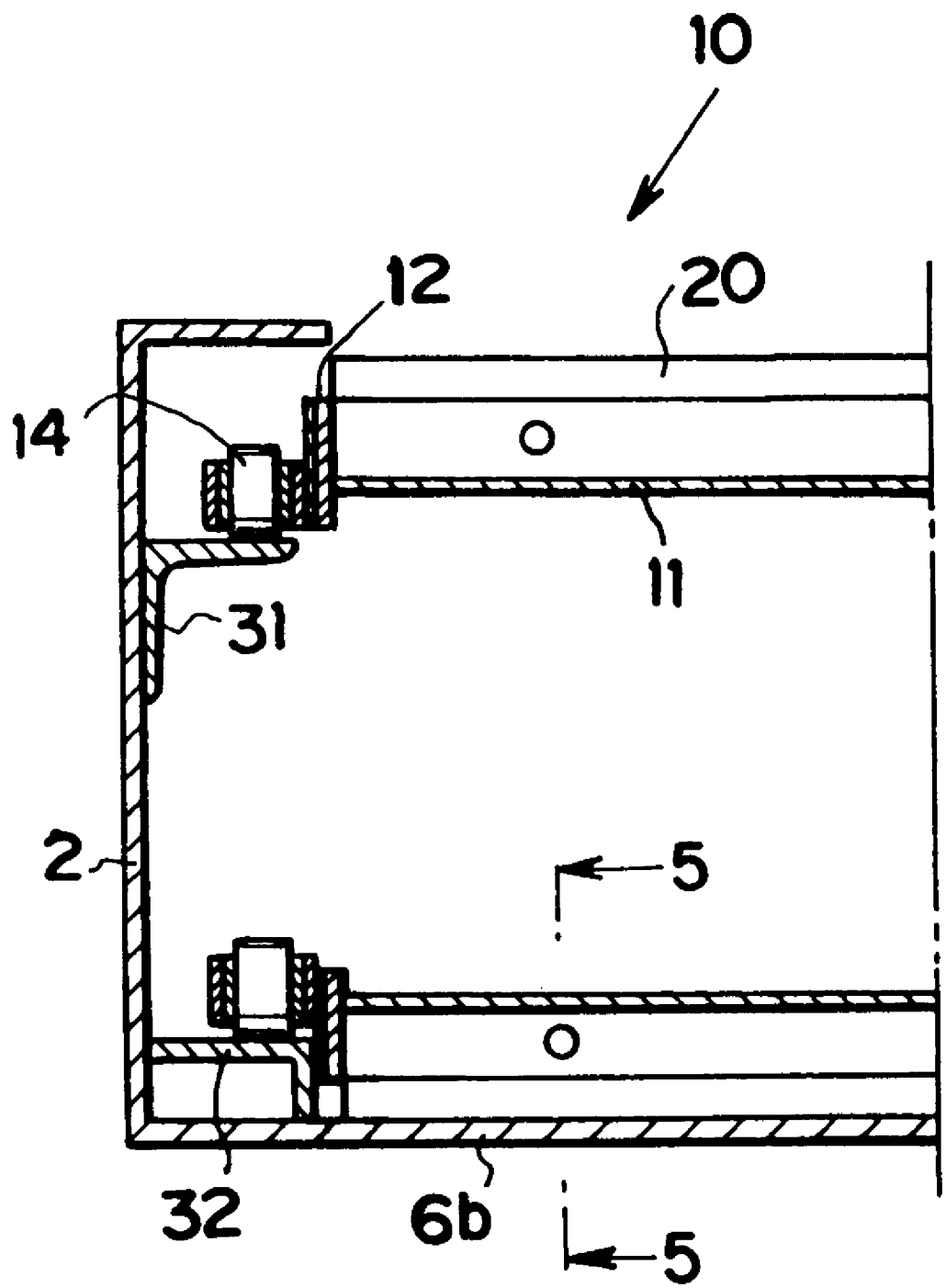
FIG. 3 is a cross-sectional view cut along a line 3—3 in FIG. 1.
Figure 4:
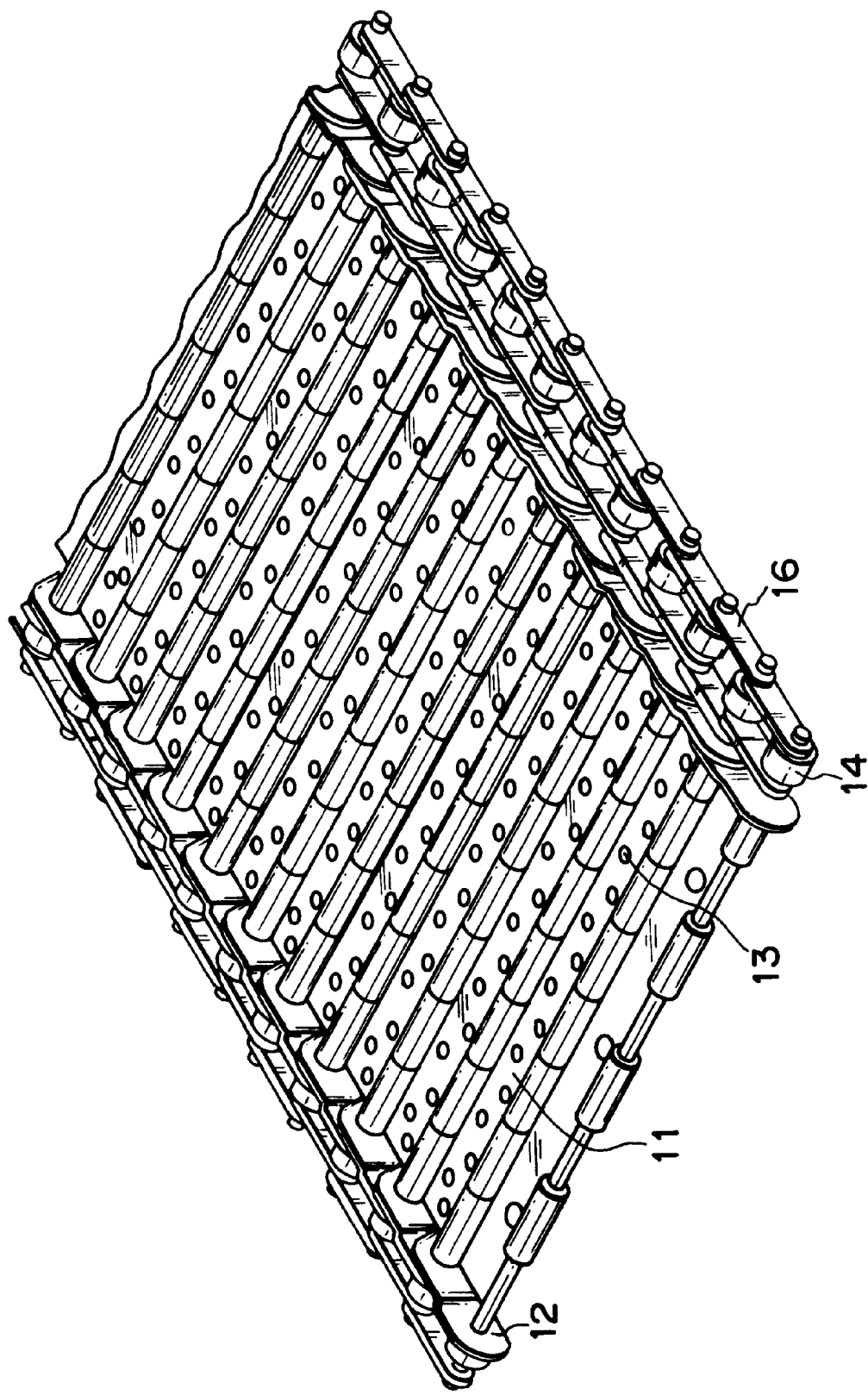
FIG. 4 is a perspective view showing in detail the structure of the hinge belt in FIG. 1.
Figure 5:
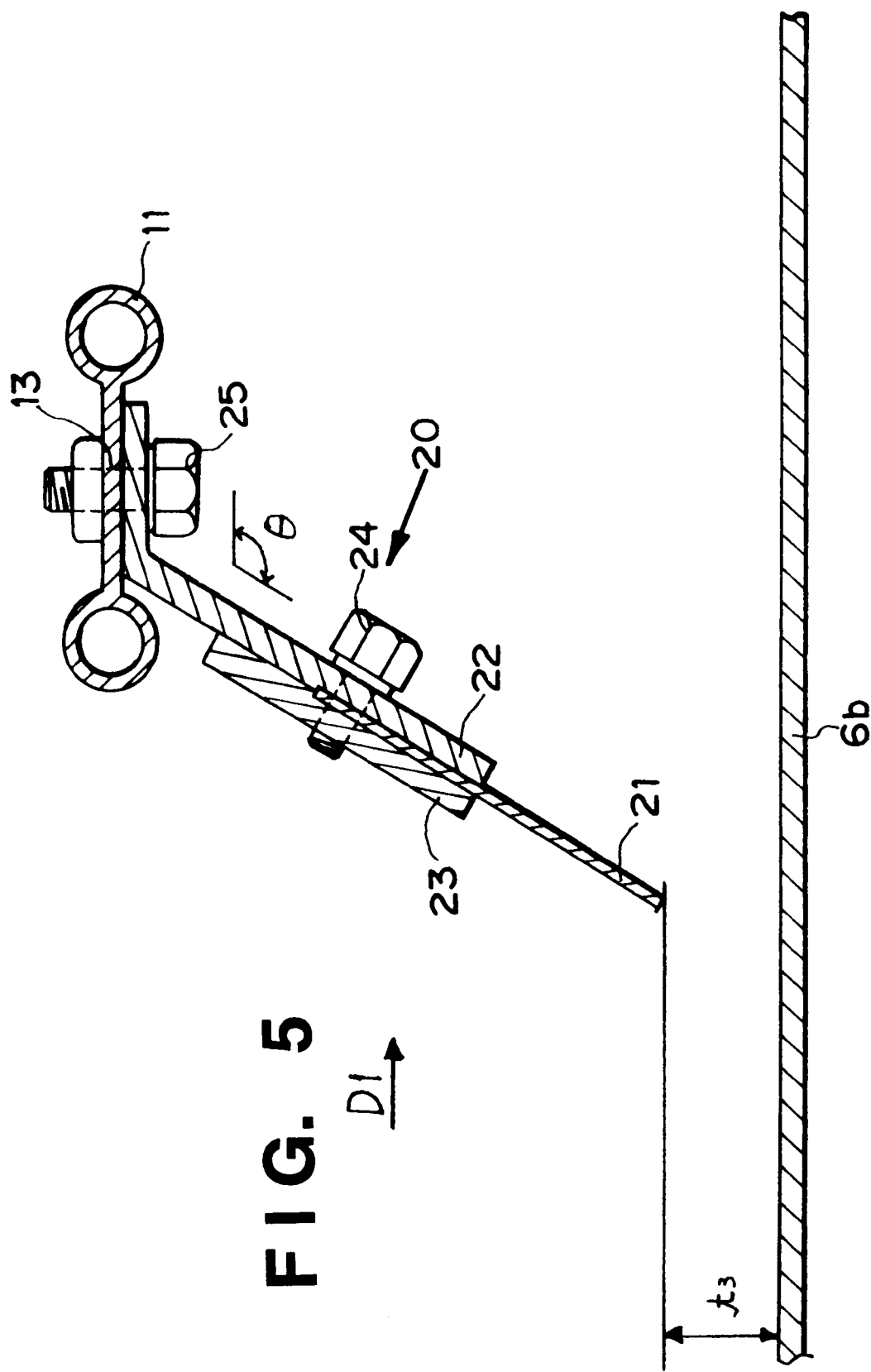
FIG. 5 is a cross-sectional view cut along a line 5—5 in FIG. 3.
Figure 6:
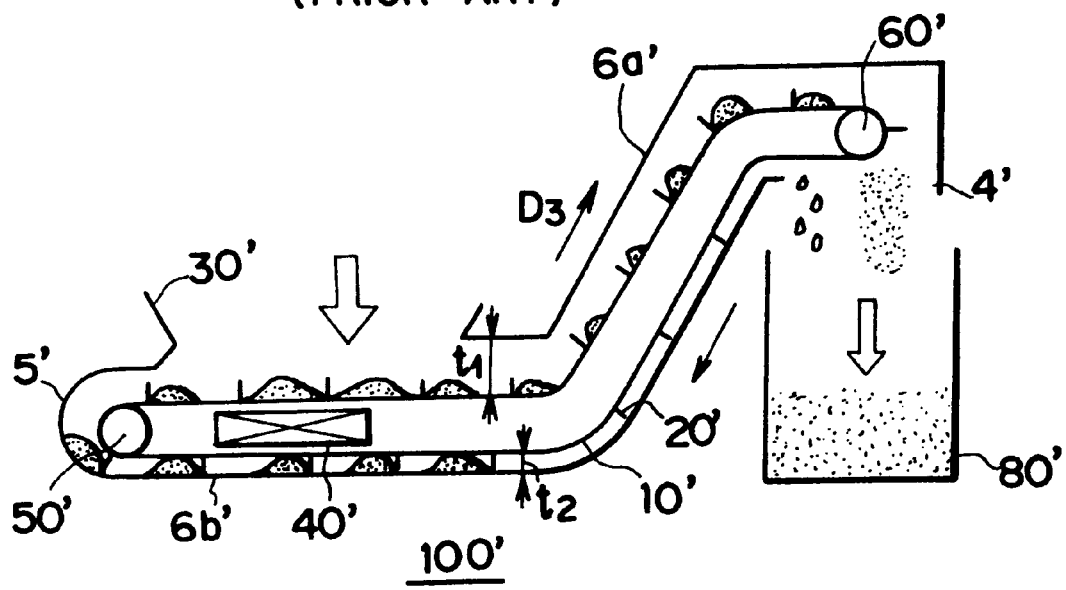
FIG. 6 is a cross-sectional view schematically showing a conventional filtering apparatus and its filtering principle.

Next, the detailed construction of the hinge belt 10 will be described. FIG. 4 is a perspective view showing in detail the structure of the hinge belt in FIG. 1. FIG. 5 is a cross-sectional view cut along a line B—B in FIG. 3.

In FIGS. 1 and 4, the hinge belt 10 has a plurality of hinge plates 11 connected to each other like hinges, a plurality of side plates 12 provided at the width-directional edge portions of the hinge plates 11, a plurality of link plates 16 provided at the sides of the side plates 12, and a plurality of roller links 14 rotatably supported by the link plates 16. The hinge plates 11 and the side plates 12 are connected into a caterpillar type belt form. The hinge plate 11 has a plurality of through holes 13 which pass sludge but do not pass curled cuttings, dumpling cuttings and the like. Note that the through holes 13 are not essential parts, however, in case where a secondary filter like a drum filter in a second embodiment is employed, the through holes 13 are effectively used to ensure a certain amount of cutting oil.

Further, the hinge belt 10 has hinge scrapers 20 arranged at predetermined intervals (e.g., equal intervals) on the outer surface of the hinge belt 10, in a belt width direction. As shown in FIG. 5, the hinge scraper 20 has a spring plate 21, a first support plate 22 and a second support plate 23. The spring plate 21 is held by an end portion of the first support plate 22, bent at an angle θ (e.g., 90°–120°) for easily sweeping cuttings, in a direction opposite to a rotation direction D1, and the second support plate 23. The first support plate 22 is fixed, at the other end portion, on the upper surface of the hinge plate 11, via the through hole 13 and fixing bolt and nut 25, for example. The spring plate 21 comprises an elastic plate member such as rubber or metal plate. The spring plate 21 is held, between the end portion of the first support plate 22 on the bottom plate 6b side and the second support plate 23, and fixed by tightly joining these support plates 22 and 23 with e.g. the bolt 24. An interval t3 between the bottom plate 6b and the end of the spring plate 21 facing the bottom plate 6b is set (e.g., about 5–30 mm) for permitting conveyance of cuttings by the hinge belt in accordance with the size of cuttings and the like, so that sludge which drops through the intervals in the hinge belt 10 and the through holes 13, and cuttings which have not dropped into the cuttings reservoir 80 and attached to the surface of the hinge plates 11, are swept between the surface of the hinge plates 11 and the bottom plate 6b toward the top part. Note that as the spring plate 21 is not an essential member, the hinge scraper 20 may comprise the first support plate having an extended length corresponding to that of the spring plate 21.

Figure 7:
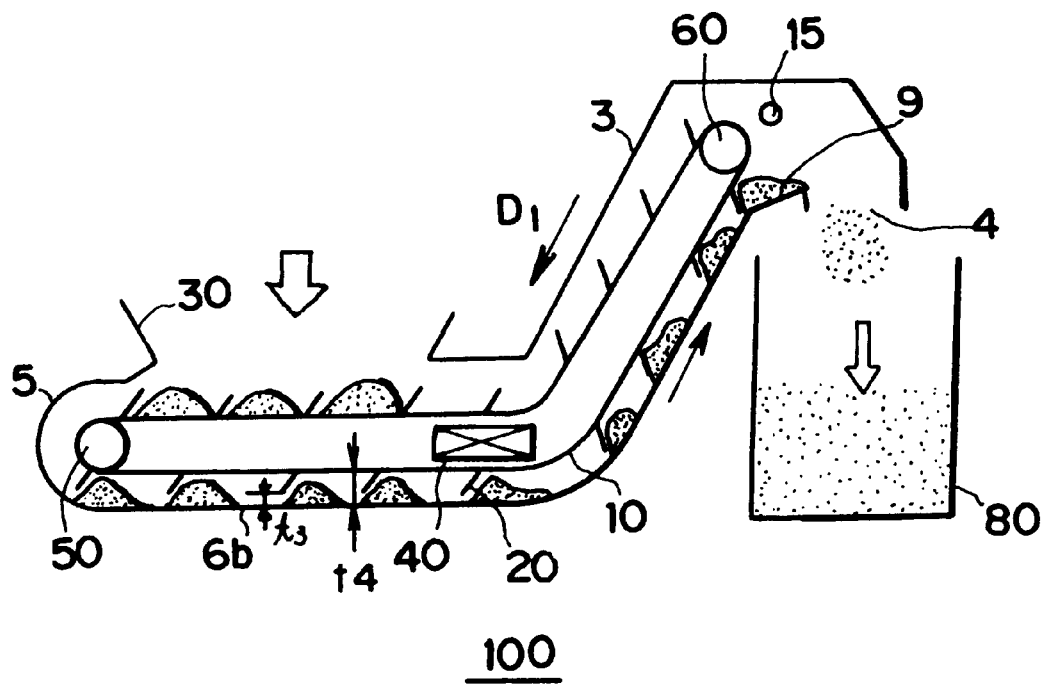
FIG. 7 is a cross-sectional view schematically showing the filtering apparatus and its filtering principle according to the first embodiment.

Further, as shown in FIG. 7, an interval t4 (e.g., about 100–150 mm) between the hinge plate 11 and the bottom plate 6b may be widened, and the interval t3 between the end of the scraper 20 and the bottom plate 6b may be wider than the conventional interval t2 for permitting conveyance of curled cuttings and dumpling cuttings larger than sludge, by the scrapers 20.

Conveyor Guide

Figure 2:
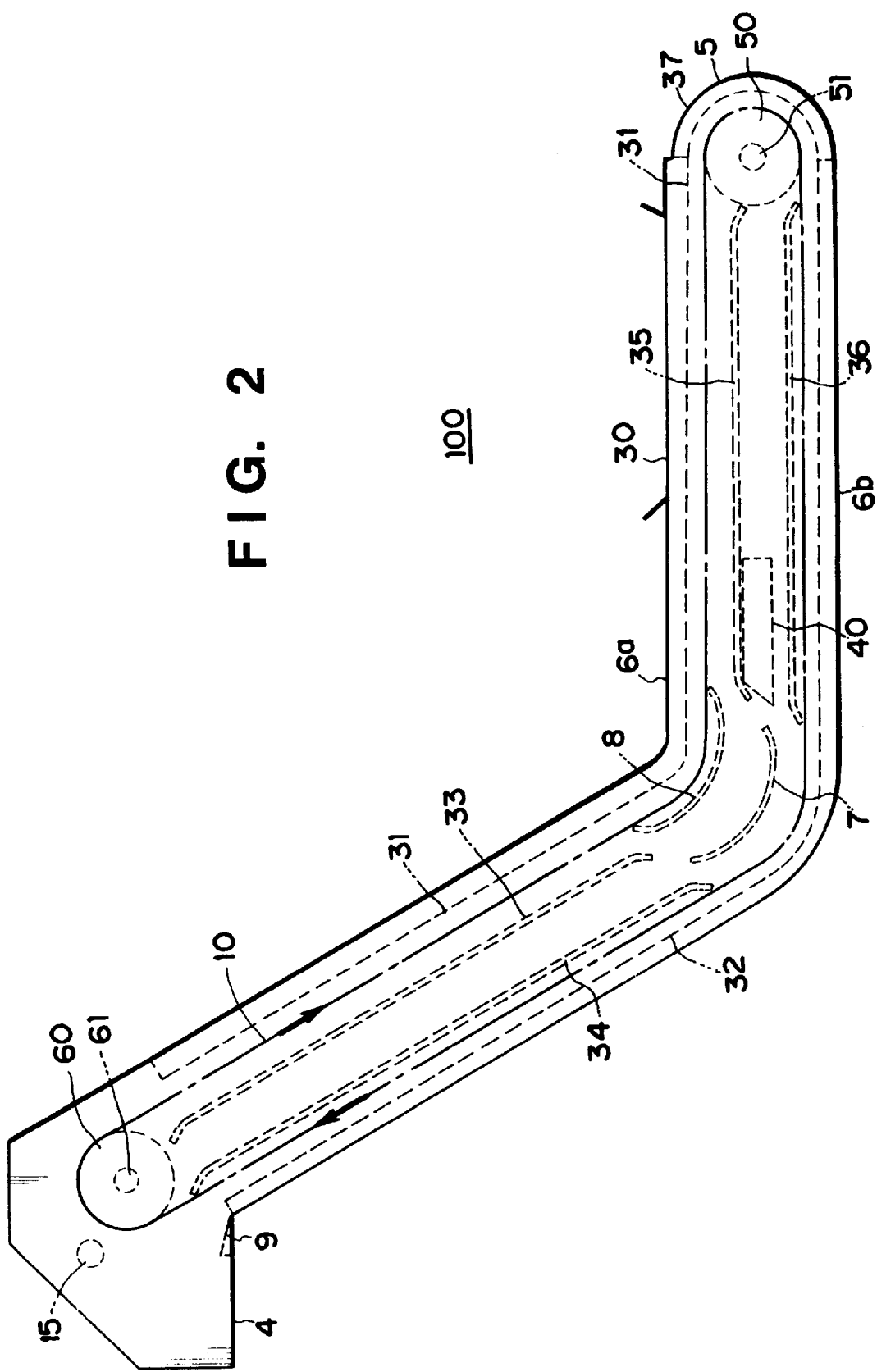
FIG. 2 is a cross-sectional view schematically showing conveyor guides guiding a hinge belt along the apparatus main body in FIG. 1.

Next, the construction of the conveyor guides guiding the above-described hinge belt 10 in the hinge filtering apparatus main body will be described. FIG. 2 is a cross-sectional view schematically showing conveyor guides guiding the hinge belt 10 along the apparatus main body in FIG. 1. FIG. 3 is a cross-sectional view cut along a line A—A in FIG. 1.

In FIG. 2, the outer peripheral portion of the hinge belt 10 is guided by a top-plate conveyor guide 31 fixed by welding or the like on the top plate 6a and the left- and right-side wall covers 2 and 3, a bottom-plate conveyor guide 32 fixed by welding or the like on the bottom plate 6b and the left- and right-side wall covers 2 and 3, and a tail conveyor guide 37 fixed by welding or the like on the tail cover 5 and the left- and right-side wall covers 2 and 3. The inner peripheral portion of the hinge belt 10 is guided by the above-described upper and lower conveyor guides 7 and 8, a first center conveyor guide 33 and a second center conveyor guide 34 fixed by welding or the like on the left- and right-side wall covers 2 and 3 at positions in the slope part, and a third center conveyor guide 35 and a fourth center conveyor guide 36 fixed by welding or the like on the left- and right-side wall covers 2 and 3 at positions in the horizontal part. The hinge belt can be smoothly rotated like a belt conveyor by adjusting the tension of the hinge belt to a proper level.

As shown in FIG. 3, the roller links 14 of the upper part of the hinge belt 10 are slidably arranged on the top-plate conveyor guide 31, and similarly, the roller links 14 of the lower part of the hinge belt 10 are slidably arranged on the bottom-plate conveyor guide 32. Further, the side plates 12 of the hinge belt 10 serve as partitions preventing the left side surface of the hinge belt from projecting on the top-plate conveyor guide 31, the bottom-plate conveyor guide 32, the roller links 14 and the like, for the purpose of preventing harmful influence on the rotation of the hinge belt 10, caused by curled cuttings and dumpling cuttings from the hinge plates 11 caught by the roller links 14, the link plates 16 and the like. Note that similar arrangement is made on the right-side surface of the hinge belt 10.

Principle of Filtration of Dirty Liquid

Next, the principle of filtering dirty liquid by the hinge filtering apparatus according to the first embodiment will be described with respect to FIG. 7.

In FIGS. 1 and 7, dirty liquid poured in the dirty-liquid inlet port 30 passes through the intervals and the through holes 13 of the hinge plates 11, whereby curled cuttings and dumpling cuttings are separated from oil as primary clean liquid. The filtered primary clean liquid is gradually accumulated in the horizontal part of the hinge filtering apparatus main body, and at a point where the oil surface of the primary clean liquid becomes higher than the primary clean-liquid outlet port 40, the primary clean liquid is discharged from the primary clean-liquid outlet port 40 into the primary clean-liquid tank 1. On the other hand, the curled cuttings and dumpling cuttings remaining on the hinge plates 11 are conveyed by the hinge belt 10 and the scrapers 20 in the conveyance direction D1, from the tail cover 5 to the bottom plate 6b, swept by the scrapers 20 on the bottom plate 6b in the horizontal part, pumped in the slope part toward the top part, and in the top part, discharged from the primary clean-liquid outlet port 40. It is arranged such that after a predetermined distance conveyance of the cuttings separated from the dirty liquid toward the upstream of the cuttings outlet port 4, most of the primary clean liquid is removed from the cuttings. Further, the cuttings remover 15 removes cuttings, conveyed on the bottom plate 6b and caught by the scrapers 20 so as to prevent downward conveyance of the cuttings by the hinge belt. As shown in FIG. 7, the oil trap plate 9 is provided in the top part so as to prevent the primary clean liquid attached to the hinge belt 10 from dropping into the cuttings reservoir 80.

Note that the filtering apparatus of the first embodiment is applicable to filtration of various wastes such as metal cuttings from machine tools as well as curled cuttings and dumpling cuttings from cutting process.

As described above, according to the hinge filtering apparatus of the first embodiment, as the hinge belt 10 can be rotated in the clockwise direction, the same as the rotation direction of a general drum-filter type filtering apparatus, the combination of this hinge filtering apparatus and a secondary filter is possible. This enables efficient filtration by rough filtration of curled cuttings and fine filtration of sludge thereafter.

Further, the interval between the hinge belt 10 and the bottom plate 6b is wider than that of the conventional filtering apparatus, so as to permit conveyance of curled cuttings and dumpling cuttings larger than sludge by the scrapers 20. This solves the inconvenience in the conventional long-hour use that causes sludge accumulation between the bottom plate or tail cover and the hinge belt and may even stop the rotation of tail-side sprockets, and further, this eliminates periodical cleaning of the apparatus, and enables a long-hour operatorless driving.

Further, as the hinge belt 10 is rotated such that the hinge scrapers 20 are rotated along the bottom plate 6b of the hinge filtering apparatus main body, the cuttings are forwarded by the scrapers 20 between the bottom plate 6b and the lower part of the hinge belt 10 to the cuttings outlet port. This eliminates the conventional conveyance of sludge accumulated on the bottom plate via a tail cover to the upper part of the hinge belt, thus enables efficient discharge of sludge, and mitigates the drawback that sludge easily accumulates on the tail cover.

Further, in the first embodiment, the clean-liquid outlet port 40 is provided in the horizontal part, at a position where sludge tends to be caught, close to the slope part. The sludge which especially accumulates between the upper and lower parts of the hinge belt 10 is stirred by the hinge belt 10, and appropriately discharged from the clean-liquid outlet port 40. This solves the inconvenience by sludge caused by long-hour use, eliminates periodical cleaning, and enables a long-hour operatorless driving.

Further, the cuttings remover 15 is provided on the left- and right-side wall covers 2 and 3, at the positions close to the orbital path of the hinge scrapers 20, and the oil trap plate 9 is provided around the cuttings outlet port 4, below the cutting remover 15. This effectively drops curled cuttings and dumpling cuttings, caught by the scrapers 20, into the cuttings reservoir 80, and prevents the inconvenience that upon dropping of the cuttings from the cuttings outlet port 4, used cutting oil attached to the hinge belt 10 drops into the cuttings reservoir 80, where the cuttings and the cutting oil are mixed.

Second Embodiment

Figure 8:
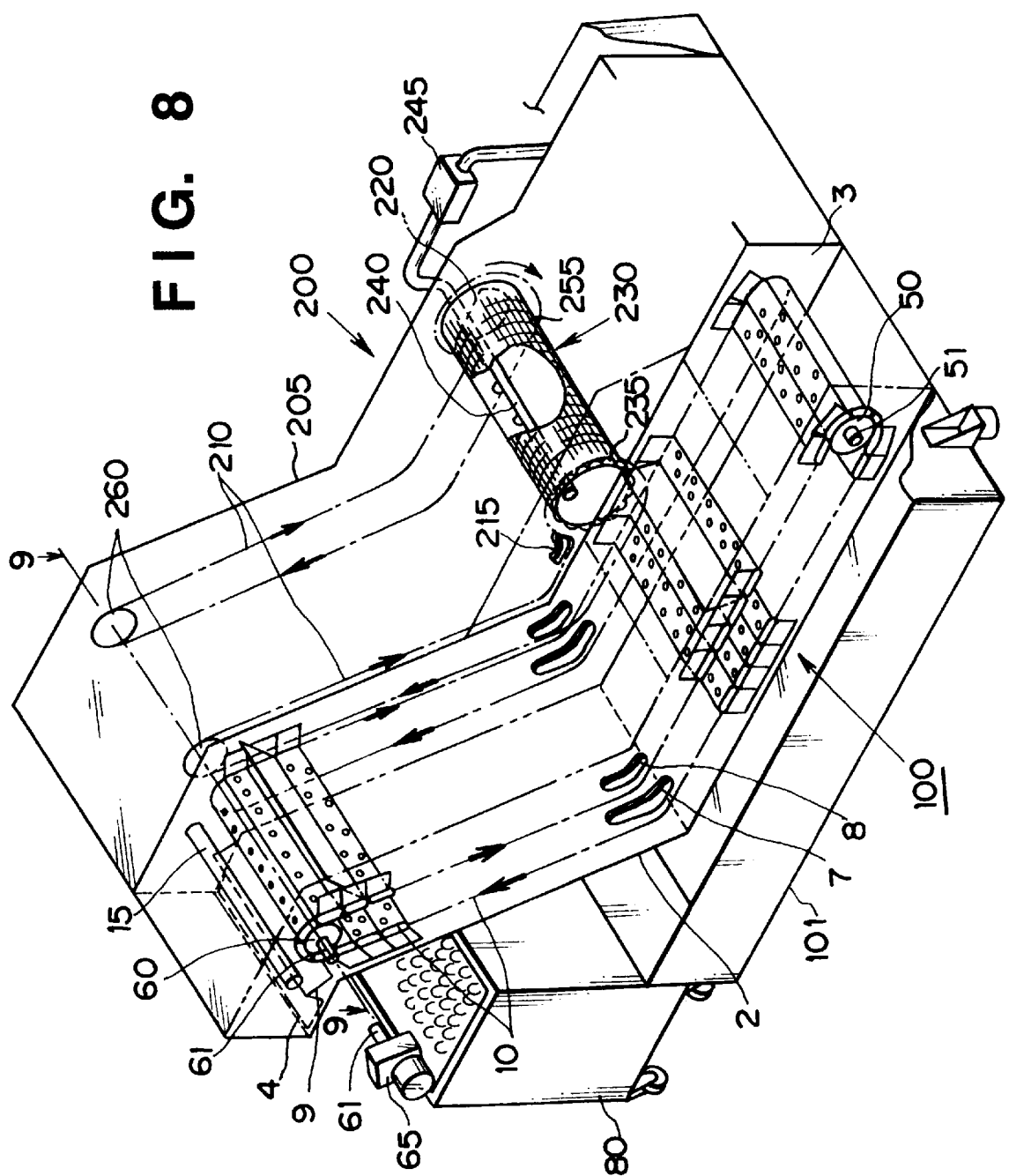
FIG. 8 is a perspective view schematically showing the structure of a filtering system according to a second embodiment of the present invention, in which the cover and the like are removed.

Next, a filtering system where the hinge-belt type filtering apparatus of the first embodiment and a drum-filter type filtering apparatus (hereinafter referred to as "drum filtering apparatus") are integrated will be described as a second embodiment of the present invention. FIG. 8 is a perspective view schematically showing the structure of the filtering system according to the second embodiment of the present invention, in which the cover and the like are removed.

Note that the drum filtering apparatus used in the second embodiment has a similar structure to that disclosed in Japanese Patent Application Laid-Open No. 7-227507, therefore, only the features and significant points of the drum filtering apparatus when integrally used with the hinge filtering apparatus, will be described in the following description, but detailed description of this apparatus will be omitted. Regarding the hinge filtering apparatus, the elements corresponding to those in the first embodiment have the same reference numerals and explanation of those elements will be omitted.

First, in FIG. 8, the filtering system of the second embodiment comprises the hinge filtering apparatus 100 and a drum filtering apparatus 200 integrated with each other. The drum filtering apparatus 200 is provided in parallel to the right-side wall cover 3 of the hinge filtering apparatus 100.

A base tray 101 as the base of the entire filtering system is greater than the primary clean-liquid tank 1 of the first embodiment, and has an opening also greater than that of the primary clean-liquid tank 1 of the first embodiment, for accommodating the hinge filtering apparatus 100 and the drum filtering apparatus 200.

The drum filtering apparatus main body, integrated with the hinge filtering apparatus 100, has a hollow substantially-L rectangular shape, formed by connecting, by welding or the like, each peripheral portion of the right-side wall cover 3 as a common member to the hinge filtering apparatus 100, a right-side wall cover 205 of a flat metal plate, a tail cover (not shown), a top plate, and a bottom plate. The drum filtering apparatus main body has a liquid-tight structure, i.e., separated from the base tray 101 and the hinge filtering apparatus except the primary clean-liquid outlet port 40, such that even if the drum filtering apparatus main body is placed within the base tray 101, dirty liquid poured into the hinge filtering apparatus and secondary clean liquid in a secondary clean-liquid tank 280 to be described later do not mix with each other. Note that similar to the first embodiment, the drum filtering apparatus main body may be constructed such that its bottom plate is also used as the bottom plate of the base tray 101, thus formed integrally with the base tray 101 by welding the bottom plate of the base tray 101, the left-side wall cover, the right-side wall cover, the tail cover and the top plate, into liquid-tight structure.

The hinge filtering apparatus 100 and the drum filtering apparatus 200 are connected via the primary clean-liquid outlet port 40 (See FIG. 10) formed on the common left-side wall cover 3. That is, primary clean liquid filtered by the hinge filtering apparatus 100 is discharged from the primary clean-liquid outlet port 40 into the drum filtering apparatus 200.

Constituents of Drum Filtering Apparatus

Figure 9:
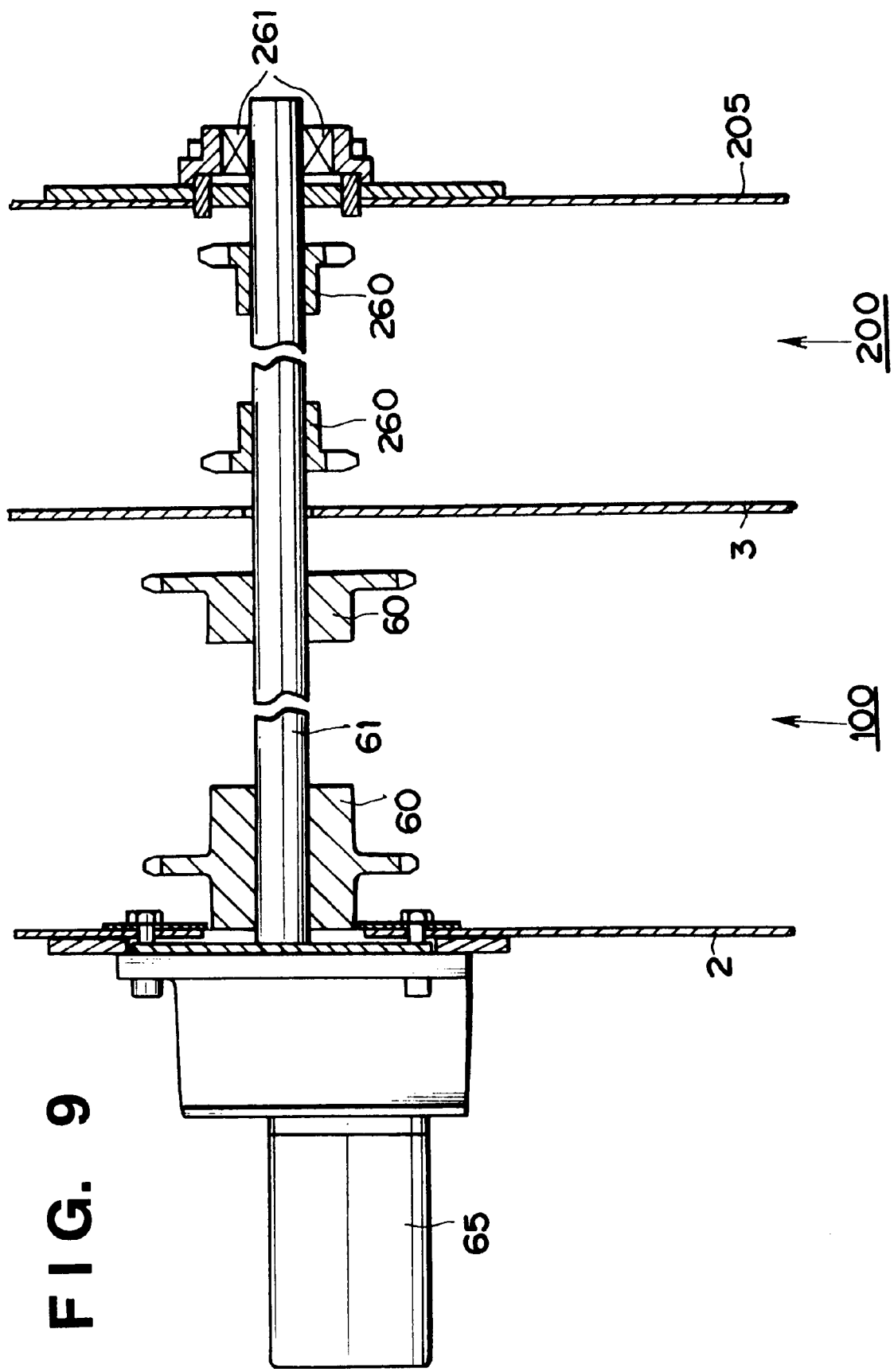
FIG. 9 is a cross-sectional view cut along a line 9—9 in FIG. 8.
Figure 10:
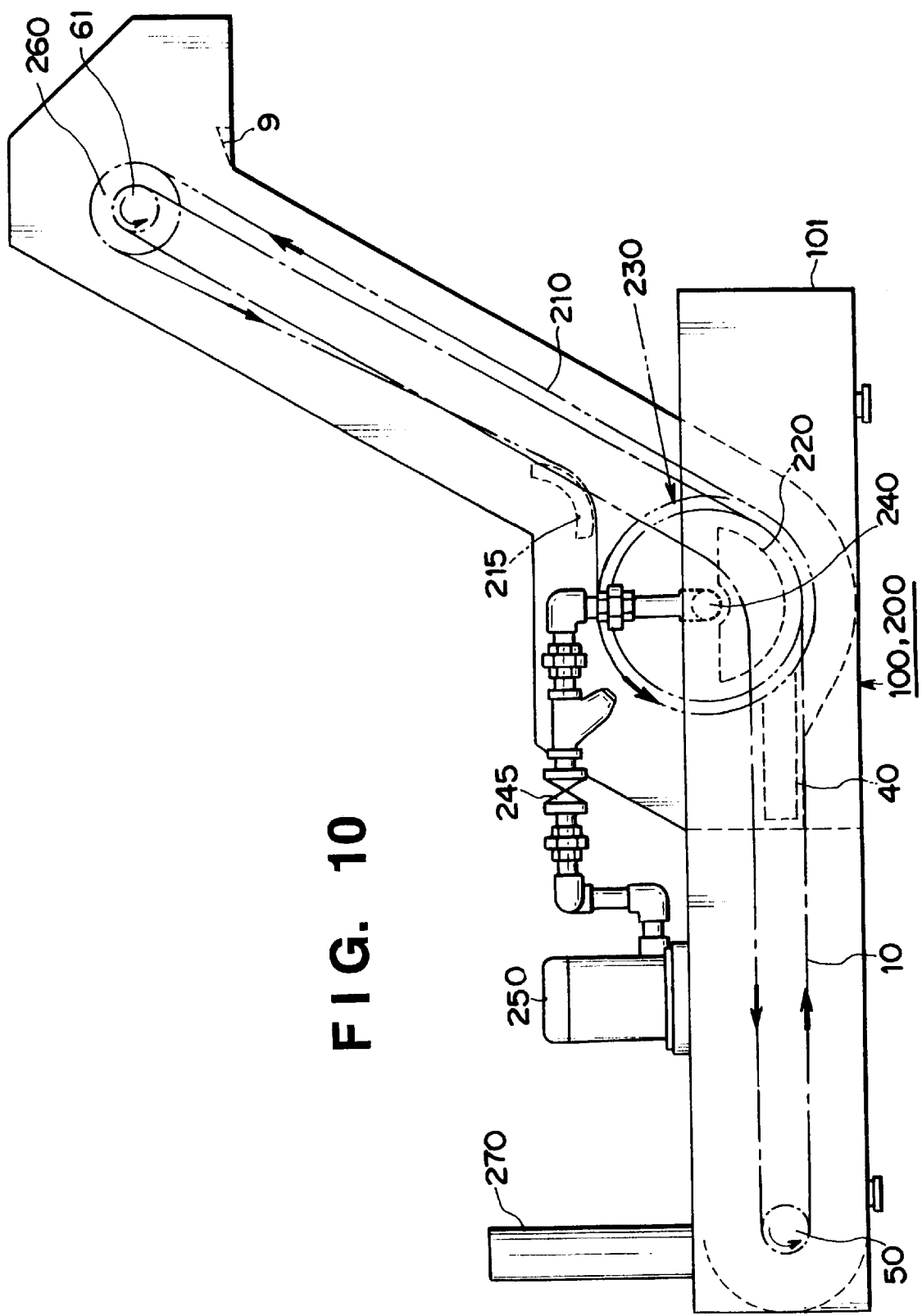
FIG. 10 is a cross-sectional view showing the filtering system of the second embodiment in FIG. 8, viewed from a drum-filter type filtering apparatus side.
Figure 11:
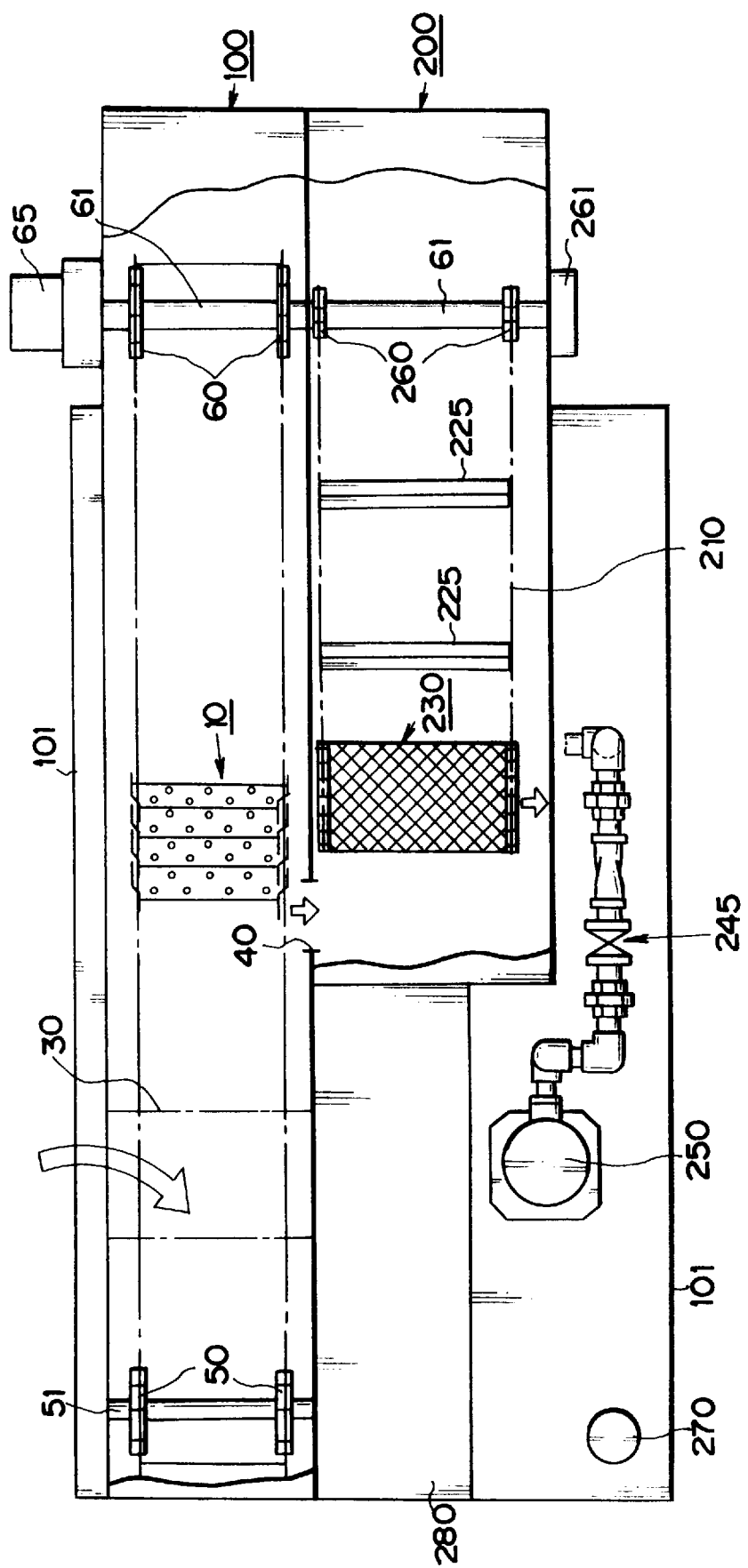
FIG. 11 is a top plan view showing the filtering system of the second embodiment.

Next, the constituents of the drum filtering apparatus will be described. FIG. 9 is a cross-sectional view cut along a line C—C in FIG. 8. FIG. 10 is a cross-sectional view showing the filtering system in FIG. 8, viewed from the drum filtering apparatus side. FIG. 11 is a top plan view showing the filtering system.

In FIGS. 8 to 11, the drum filtering apparatus main body comprises a horizontal part placed in the base tray 101, a slope part extending diagonally upward from the horizontal part and a top part extending horizontally from the top of the slope part.

As apparently shown in FIG. 9, a pair of left and right top-side drum bearings 261 (left side bearing is not shown) on the left- and right-side wall covers 3 and 205 close to the slope part of the drum filtering apparatus main body. The top-side shaft 61 of the hinge filtering apparatus 100 extends into the drum filtering apparatus 200, and functions as a common shaft to the both filtering apparatuses 100 and 200. That is, the top-side sprocket 60 of the hinge filtering apparatus 100 and a top-side drum sprocket 260 of the drum filtering apparatus 200 are provided on the top-side shaft 61, and rotatably supported by the top-side shaft 61 with respect to the filtering apparatuses 100 and 200. Further, the top-side shaft 61 is fixed on the left-side wall cover 2 of the hinge filtering apparatus 100, and connected to the output shaft of the drive motor 65 integrally having a chain and a sprocket mechanism, thus the top-side shaft 61 can continuously drive the top-side sprocket 60 and the top-side drum sprocket 260 in a clockwise direction (viewed from the left-side wall cover 2), interlocked with each other, with the drive of drive motor 65. The drive motor 65 rotate-drives the hinge belt 10 such that the above-described hinge scrapers 20 are rotated from the horizontal part to the slope part, along the bottom plate 6b of the hinge filtering apparatus main body.

Thus, the top-side shaft 61 and the drive motor 65 can be commonly used by unifying the rotation directions of the hinge filtering apparatus 100 and the drum filtering apparatus 200, this reduces cost.

On the other hand, in the drum filtering apparatus main body, a pair of left and right endless chains 210 (partially represented in an alternate long and two short dashed line in FIG. 10) are provided between the top-side drum sprocket 260 and a drum sprocket 235 (See FIG. 8) to be described later, and engaged with the respective sprockets at the end portions of the apparatus. As shown in FIG. 10, a chain guide (not shown) is fixed on the left-side wall cover 3, at a rotation-direction switching position, and a drum chain guide 215 is fixed on the right-side wall cover 205, at a position corresponding to the position of the chain guide, in front of the drum filter 230, so as to guide the left and right chains 210 along the left- and right-side wall covers 3 and 205, and provide a rotation driving force to a drum filter 230.

On the other hand, a predetermined number of drum scrapers 225 (See FIG. 11), for conveying sludge settled in primary clean-liquid toward the top part of the drum filtering apparatus, are fixed between the left and right chains 210 at predetermined intervals. It is arranged such that at predetermined distance conveyance of the sludge toward the top part, most of the primary clean liquid is removed from the sludge.

Further, the drum sprocket 235 is fixed on the circumferential surface of the drum filter 230. The drum sprocket 235 obtains rotation forces from the left and right chains engaged with the drum sprocket 235, and rotates in the clockwise direction.

On the drum filter 230, an exchangeable filter 255, comprising a stainless-steel net, a chemical fiber mesh, a wedge wire, punching metal and the like, is fixed on the circumferential surface of the drum filter 230. Secondary clean liquid is obtained by passing primary clean liquid through the filter 255, and discharged via an opening 220 (represented by a broken line), having a circular or semicircular shape for example, provided on the right-side wall cover 205. The secondary clean liquid is stored into the secondary clean-liquid tank 280 placed on the base tray 101.

On the other hand, the drum filter 230 includes a jet nozzle 240 connected to a pipe 245 and a pump 250. So-called reverse cleaning is performed on the filter 255 via the jet nozzle 240, so as to remove sludge clogged in the filter 255 and enable continuous filtering operation. As shown in FIG. 11, the secondary clean-liquid tank 280 storing secondary clean liquid where sludge has been filtered off, and a liquid surface monitor 270 for monitoring the amount of the secondary clean liquid in the secondary clean-liquid tank 280, are provided in the base tray 101.

Principle of Filtration of Dirty Liquid

Next, the principle of filtering dirty liquid by the filtering system according to the second embodiment will be described with reference to FIG. 12.

Figure 12:
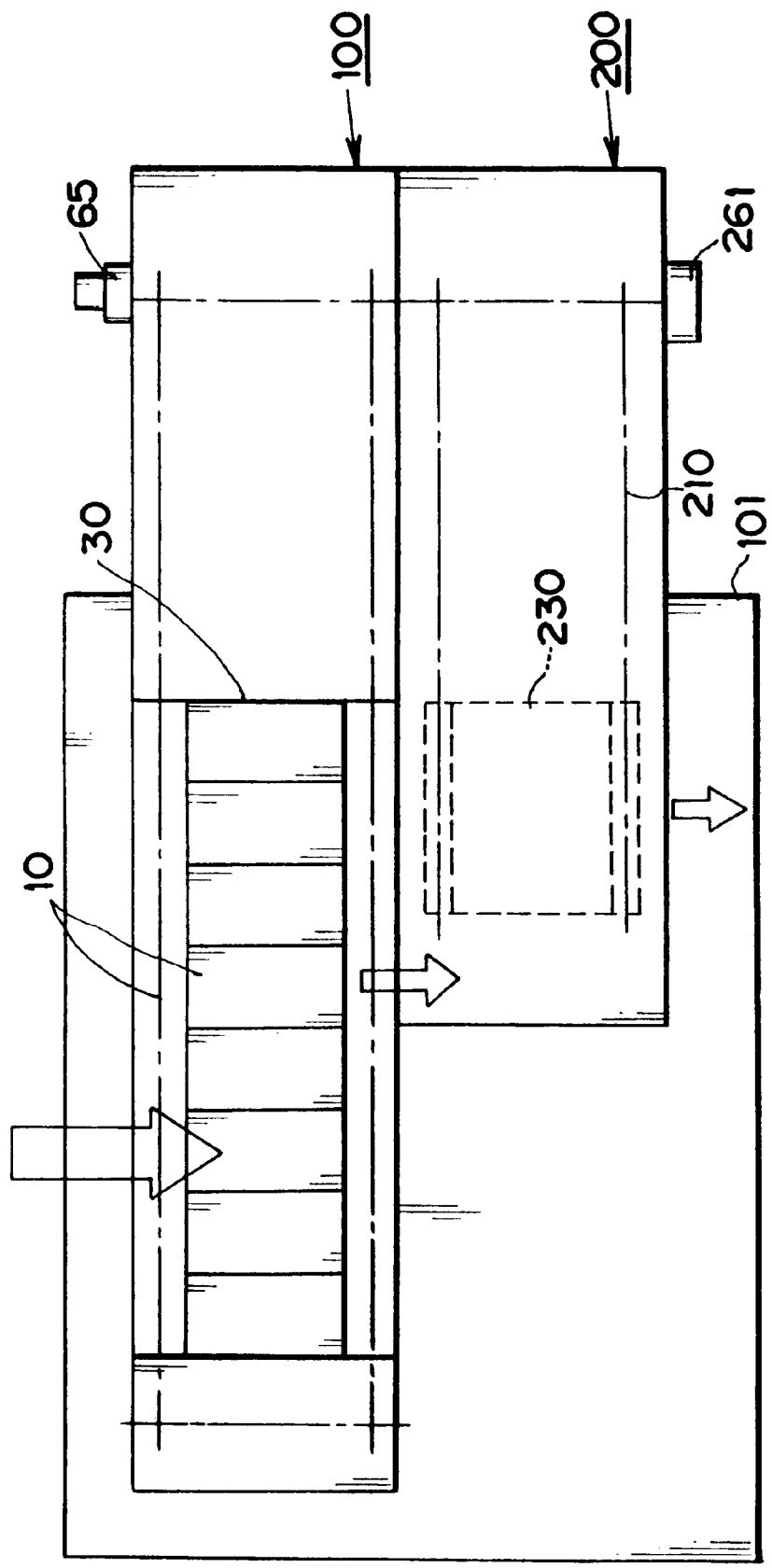
FIG. 12 is a schematic view explaining the filtering principle of the filtering system according to the second embodiment.
Figure 13:
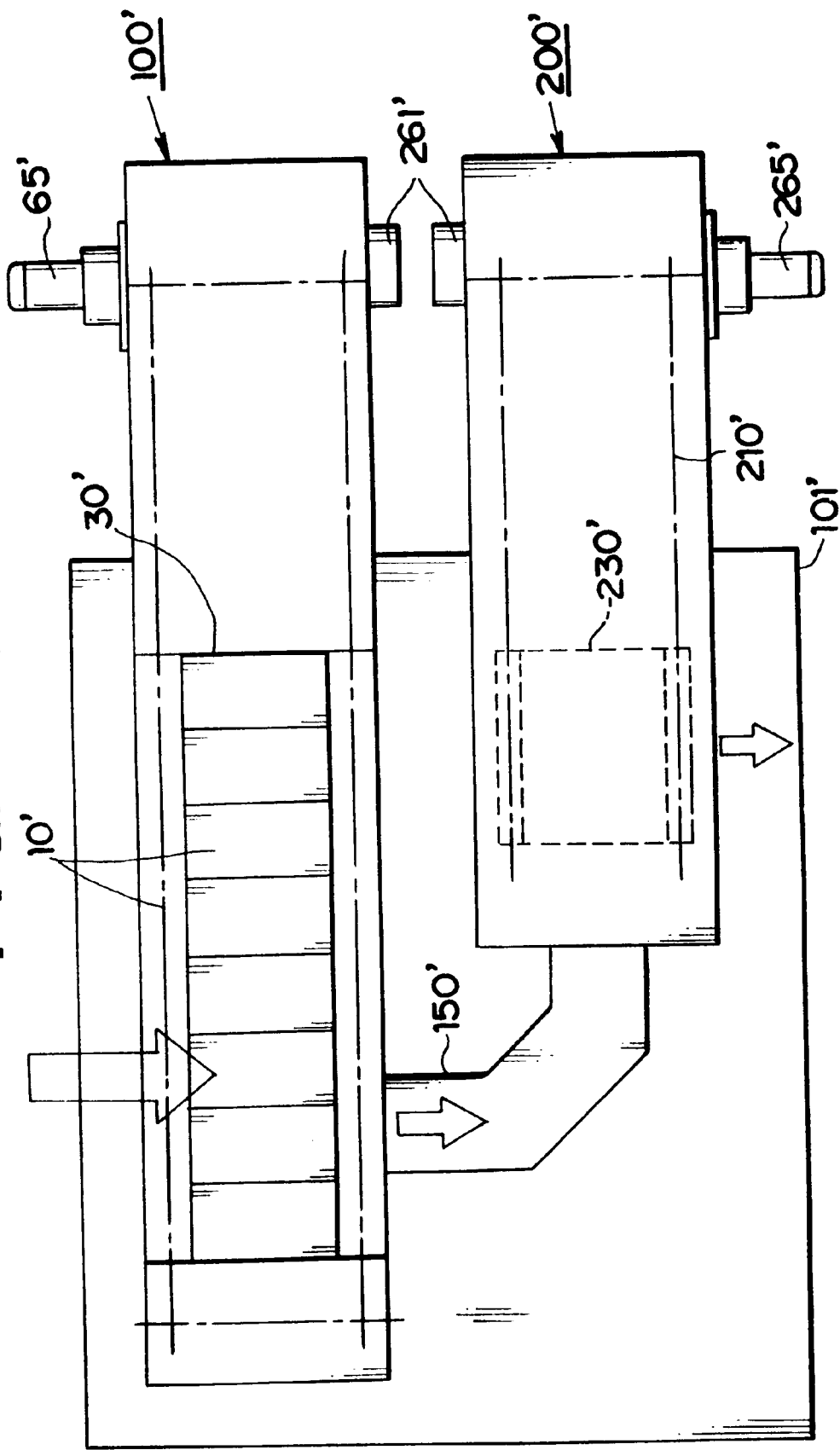
FIG. 13 is a schematic view showing the drive mechanisms of the conventional filtering system.

In FIGS. 11 and 12, first, dirty liquid is poured from the dirty-liquid inlet port 30 of the hinge filtering apparatus 100, and passes through the intervals between the hinge plates 11 and the through holes 13 of the hinge belt 10 (see FIG. 4), whereby curled cuttings and dumpling cuttings are separated from oil. The resulting primary clean liquid is discharged from the primary clean-liquid outlet port 40 into the drum filtering apparatus 200. In the drum filtering apparatus 200, the drum filter 230 is rotate-driven, which filters fine cuttings such as sludge included in the primary clean liquid off and discharges the filtered liquid as secondary clean-liquid, into the secondary clean-liquid tank 280, while the secondary clean liquid is powerfully discharged from the jet nozzle 240 (See FIG. 8) by the pump 250 toward the filter 255, thus cleaning the filter 255. Note that the filtering system of the present embodiment is applicable to filtration of various wastes such as metal cuttings from machine tools as well as curled cuttings and dumpling cuttings from cutting process.

As described above, according to the filtering system of the second embodiment, primary clean liquid where large cuttings are filtered off by the hinge filtering apparatus 100 is filtered by the drum filtering apparatus 200. This enables rough filtration of curled cuttings and dumpling cuttings and fine filtration of sludge at the same time without damaging the filter 255, thus extends life of the filter 255.

Further, the filtering system does not pose any limitation on type, size and the like of the cuttings of various materials such as steel, cast iron, brass and aluminum. Further, the filtering system enables filtration of dirty liquid containing cuttings curled iron cuttings and dumpling iron cuttings, which has not been handled by any of the conventional filtering apparatuses. This enables filtration corresponding to various cutting conditions of a machining center, and further enables a long-hour operatorless driving by virtue of maintenance free filtering operation.

Further, the drive mechanisms of the hinge filtering apparatus 100 and the drum filtering apparatus 200 can be commonly used by unifying the rotation directions of the hinge filtering apparatus 100 and the drum filtering apparatus 200, this reduces manufacturing cost and enables downsizing of the overall system.

Furthermore, as the hinge filtering apparatus 100 and the drum filtering apparatus 200 are easily integrated with each other, curled cuttings and dumpling cuttings are roughly filtered by the hinge belt, and sludge is finely filtered by the drum filter, thus efficient filtration is attained, in correspondence with high-speed cutting by recent machining centers.

Controller of Filtering Apparatus and Filtering System

Figure 15:
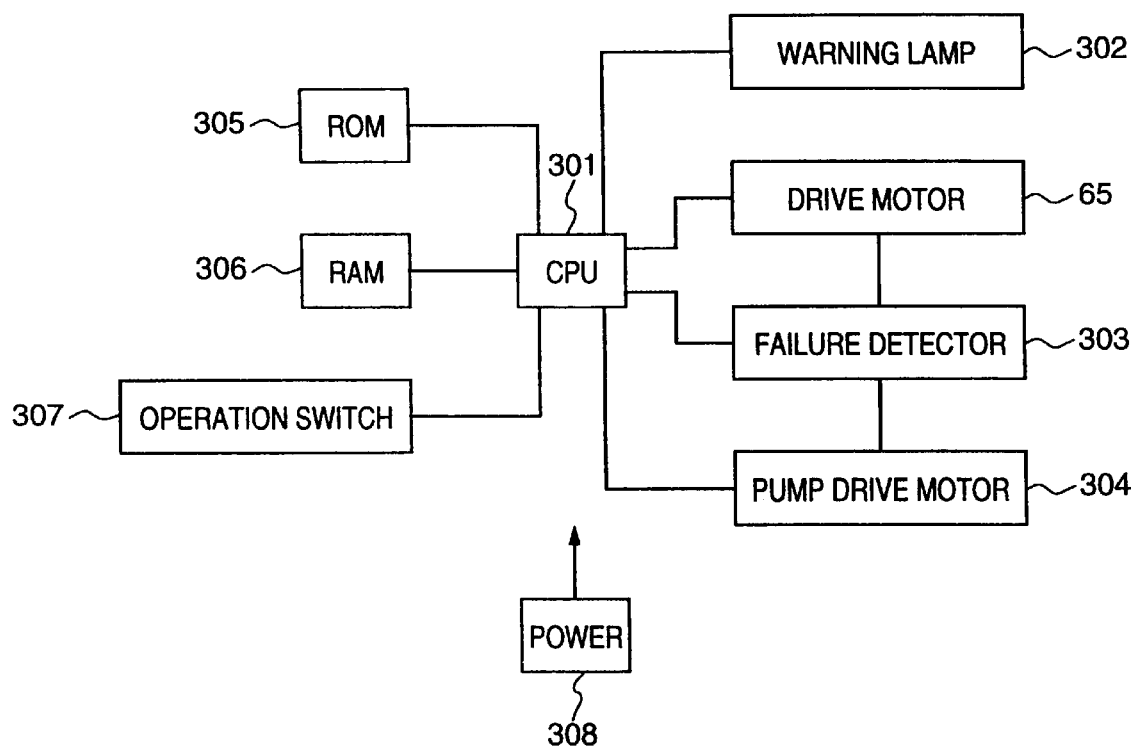
FIG. 15 is a block diagram showing the control construction of the filtering apparatus of the first embodiment and the filtering system of the second embodiment.

FIG. 15 is a block diagram showing the control construction of the filtering apparatus of the first embodiment and the filtering system of the second embodiment.

As shown in FIG. 15, the filtering apparatus of the first embodiment and the filtering system of the second embodiment have a power 308 controlled by a CPU 301. The CPU 301 drives the drive motor 65 and a pump drive motor 304 in accordance with ON/OFF operation by an operation switch 307. Further, the operation switch 307 can set the number of rotation of the drive motor 65, operation period and the like. The driving statuses of the drive motor 65 and the pump drive motor 304 are monitored by a failure detector 303. When the hinge belt and the filter stop due to clogging of cuttings and sludge, the failure detector 303 detects the stoppage from overflow of current that flows the motor or the like, and outputs a signal indicative of the failure to the CPU 301. When failure occurs to the drive motor and the like, the CPU 301 turns a warning lamp 302 on to notify an operator of the failure. The CPU 301 has a ROM 305 for storing the operation sequence and a RAM 306 used for the work area.

Note that the present invention is applicable to various changes and modifications within the spirit and scope of the present invention.

For example, the hinge filtering apparatus 100 of the first embodiment can be integrated with a magnet type filtering apparatus, an aluminum filtering apparatus, so-called Barnes Kleenal system and the like, as well as the drum filtering apparatus 200 of the second embodiment.

Further, the drum filtering apparatus 200 may have one or more filters in addition to the drum filter 230. Further, the number of secondary clean-liquid tank 280 may be increased.

Figure 14:
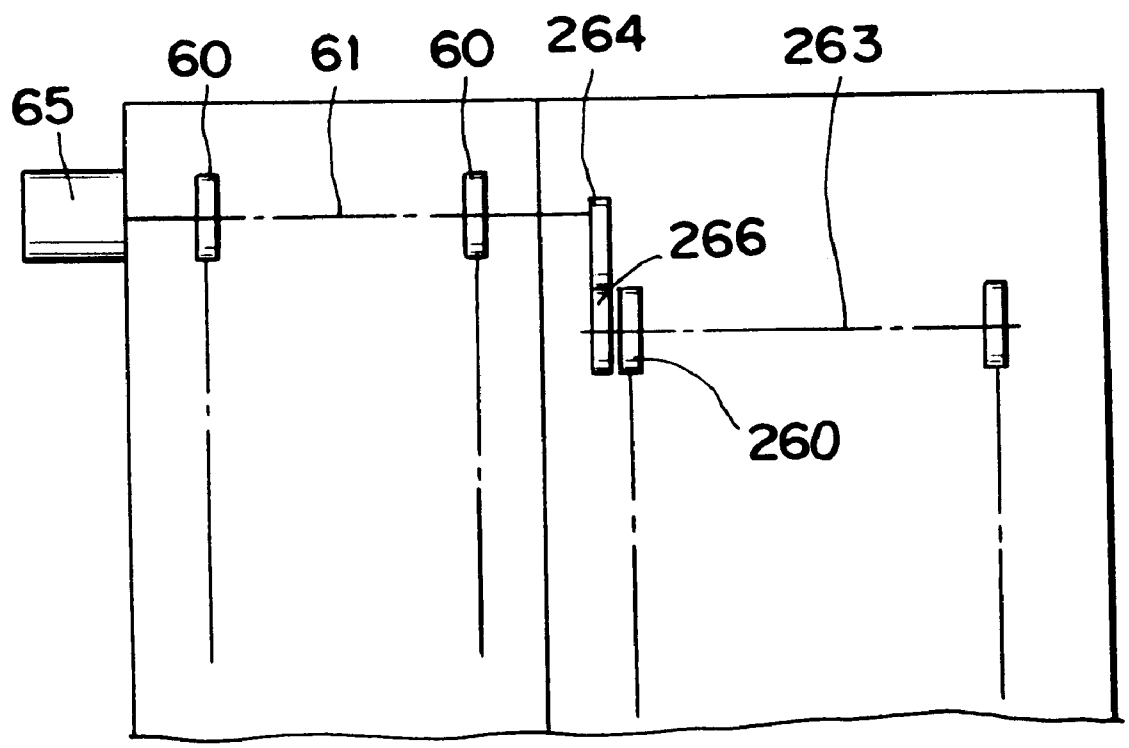
FIG. 14 is a schematic view explaining the conventional filtering system and its filtering principle.

Further, as shown in FIG. 14, the rotation direction of the hinge filtering apparatus 100 and that of the drum filtering apparatus 200 may be opposite to each other. In this case, the drum filtering apparatus 200 has a gear 264 on the top-side shaft 61, to be engaged with a counter gear 266, and the top-side drum sprocket 260 is provided on a top-side drum shaft 263 provided separately from the top-side shaft 61.

Further, the filtering apparatus of the first embodiment and the filtering system of the second embodiment are applicable to filtration of dirty liquid used by machine tools other than metal cutting process tools.

As described above, according to the filtering apparatus of the present invention, upon filtration of used coolant containing wastes such as metal cuttings so as to separate the wastes from the coolant, the conveyor is rotate-driven so as to convey wastes on the conveyor and wastes settled on the bottom surface of the filtering apparatus, while sweeping wastes between the bottom surface and the conveyor surface, to a second opening. This eliminates periodical cleaning operation, and enables a long-hour operatorless driving.

Further, according to the filtering system of the present invention, upon filtration of used coolant containing wastes such as metal cuttings so as to separate the wastes from the coolant, the conveyor of a first filtering apparatus performs rough filtration of the wastes in the coolant and obtains primary recycle coolant, and the drum filter and the filter of a second filtering apparatus performs fine filtration of primary recycle coolant. Further, a common drive means for rotate the convey and the drum filter in the same rotation direction is provided in at least one of the first and second filtering apparatus. This construction enables rough filtration of curled cuttings and dumpling cuttings and fine filtration of sludge without damaging the filter, thus enables filtration corresponding to various cutting conditions of a machining center, and further enables a long-hour operatorless use by virtue of maintenance free filtering operation.

Further, the first and second filtering apparatuses have the common drive mechanism by unifying the rotation directions of these apparatuses, which reduces manufacturing cost.

Furthermore, the first and second filtering apparatuses are easily integrated with each other, which enables efficient filtration by rough filtration of curled cuttings and dumpling cuttings by the hinge belt and fine filtration of sludge by the drum filter, corresponding to high-speed cutting process of recent machining centers.

As many apparently widely different embodiments of the present invention can be made without departing from the spirit and scope thereof, it is to be understood that the invention is not limited to the specific embodiments thereof except as defined in the appended claims.

What is claimed is:

1. A filtering apparatus for filtering used coolant containing wastes such as metal cuttings so as to separate the wastes from the coolant and reuse the separated coolant, comprising:
    a filtering apparatus main body having a first opening in which the used coolant is poured and a second opening from which the wastes are discharged and which is located higher than said first opening;
    a conveyor rotatably provided in said filtering apparatus main body, said conveyor including an endless hinge-belt that is rotatably mounted so as to filter the used coolant poured from said first opening;
    a plurality of scrapers provided on said hinge-belt at predetermined intervals, which sweeps the wastes; and
    drive means for rotating said hinge-belt so as to convey wastes which are filtered by said hinge-belt and initially dropped to a bottom surface of said filtering apparatus main body and wastes settled on the bottom surface of said filtering apparatus main body to said second opening, while sweeping the wastes along the bottom surface of said filtering apparatus main body in a space between the bottom surface and an outer surface of said hinge-belt.

2. The filtering apparatus according to claim 1, wherein said filtering apparatus main body comprises a horizontal part, a slope part extending diagonally upward from an end of said horizontal part, and a top part extending obliquely upward from the top of said slope part,
    and wherein said horizontal part has said first opening, and said top part has said second opening,
    further wherein said drive means rotates said hinge-belt such that said scrapers are rotated from said horizontal part to said slope part along the bottom surface of said filtering apparatus main body.

3. The filtering apparatus according to claim 2, wherein said first opening is provided at a low position of a machine tool and below a position where the used coolant is discharged from said machine tool.

4. The filtering apparatus according to claim 3, wherein said filtering apparatus main body further comprises a third opening from which the coolant filtered by said conveyor is discharged,
    and wherein said third opening is provided at a position where said horizontal part and said slope part are connected, between an upper part and a lower part of said hinge-belt,
    further wherein said filtering apparatus main body is placed in a coolant tank for storing the coolant filtered by said conveyor, discharged from said third opening.

5. The filtering apparatus according to claim 4, wherein a wastes remover is provided at a position around said second opening and close to an orbital path of said scrapers so as to remove the wastes entangled to said scrapers and collide with said scrapers,
    and wherein a liquid trap plate which traps the coolant filtered by said hinge-belt, dropping from said conveyor, is provided at a position below said wastes remover and around said second opening.

6. The filtering apparatus according to claim 5, wherein said hinge-belt has a plurality of hinge plates connected with each other and a plurality of side plates provided on edges of said hinge plates,
    and wherein said hinge plates and said side plates are connected into a caterpillar type belt.

7. The filtering apparatus according to claim 6, wherein the wastes placed on said hinge-belt include curled cuttings and dumpling cuttings as lumps of the curled cuttings,
    and wherein said hinge plates have a plurality of through holes of a size which does not pass the curled cuttings and dumpling cuttings.

8. The filtering apparatus according to claim 7, wherein the used coolant is cutting oil.

9. The filtering apparatus according to claim 2, wherein said hinge-belt has a plurality of hinge plates connected with each other and a plurality of side plates provided on edges of said hinge plates,
    and wherein said hinge plates and said side plates are connected into a caterpillar type belt.

10. The filtering apparatus according to claim 9, wherein the wastes placed on said hinge-belt include curled cuttings and dumpling cuttings as lumps of the curled cuttings,
    and wherein said hinge plates have a plurality of through holes of a size which does not pass the curled cuttings and dumpling cuttings.

11. The filtering apparatus according to claim 10, wherein the used coolant is cutting oil.

12. The filtering apparatus according to claim 1, wherein the used coolant is cutting oil.

13. The filtering apparatus according to claim 1, wherein said hinge-belt has a plurality of hinge plates connected with each other and a plurality of side plates provided on edges of said hinge plates,
    and wherein said hinge plates and said side plates are connected into a caterpillar type belt.

14. The filtering apparatus according to claim 13, wherein the wastes placed on said hinge-belt include curled cuttings and dumpling cuttings as lumps of the curled cuttings, and wherein said hinge plates have a plurality of through holes of a size which does not pass the curled cuttings and dumpling cuttings.

15. The filtering apparatus according to claim 14, wherein the used coolant is cutting oil.

16. A filtering system for filtering used coolant containing wastes such as metal cuttings so as to separate the wastes from the coolant and reuse the separated coolant, comprising:

a first filtering apparatus having:
   a first filtering apparatus main body having a first opening in which the used coolant is poured and a second opening from which the wastes are discharged and which is located higher than said first opening;
   a conveyor rotatably provided in said first filtering apparatus main body, said conveyor including an endless hinge-belt that is rotatably mounted so as to filter the used coolant poured from said first opening; and
   a plurality of scrapers provided on said hinge-belt at predetermined intervals, which sweeps the wastes;

a second filtering apparatus having:
   a second filtering apparatus main body having a third opening connected to said first filtering apparatus, in which primary filtered coolant obtained from filtration by said first filtering apparatus is introduced;
   a hollow drum filter rotatably provided in said second filtering apparatus main body, having a filter which filters the primary filtered coolant introduced from said third opening which is provided on a circumferential surface of the drum filter, and having a fourth opening from which the coolant filtered by the filter is discharged as secondary filtered coolant on at least one side surface of the drum filter;
   cleaning means for cleaning said drum filter; and
   a plurality of drum scrapers provided at predetermined intervals to discharge the wastes filtered by said drum filter;

wherein said first and second filtering apparatuses are combined together; and further comprising drive means, provided at least one of said first filtering apparatus and said second filtering apparatus, for rotating a shaft which rotates said hinge-belt and said drum filter in the same direction.

17. The filtering system according to claim 16, wherein said first filtering apparatus main body comprises a horizontal part, a slope part extending diagonally upward from an end of said horizontal part, and a top part extending obliquely upward from the top of said slope part, and wherein in said first filtering apparatus main body, said horizontal part has said first opening, and said top part has said second opening, further wherein said drive means rotates said hinge-belt and said drum filter such that in said first filtering apparatus main body, said scrapers are rotated from said horizontal part to said slope part along the bottom surface of said first filtering apparatus main body.

18. The filtering system according to claim 17, wherein said third opening is provided at a position where said horizontal part and said slope part are connected, between an upper part and a lower part of said hinge-belt.

19. The filtering system according to claim 18, wherein said first opening is provided at a low position of a machine tool and below a position where the used coolant is discharged from said machine tool.

20. The filtering system according to claim 19, wherein the secondary filtered coolant is stored into a secondary filtered coolant tank, separately from the primary filtered coolant.

21. The filtering system according to claim 20, wherein said hinge-belt has a plurality of hinge plates connected with each other and a plurality of side plates provided on edges of said hinge plates, and wherein said hinge plates and said side plates are connected into a caterpillar type belt.

22. The filtering system according to claim 21, wherein the primary filtered coolant is coolant where curled cuttings and dumpling cuttings as lumps of the curled cuttings have been removed, and wherein said hinge plates have a plurality of through holes of a size which does not pass the curled cuttings and dumpling cuttings.

23. The filtering system according to claim 22, wherein the secondary filtered coolant is coolant where sludge type cuttings smaller than the curled cuttings and dumpling cuttings have been removed.

24. The filtering system according to claim 23, wherein the used coolant is cutting oil.

25. The filtering system according to claim 17, wherein said hinge-belt has a plurality of hinge plates connected with each other and a plurality of side plates provided on edges of said hinge plates, and wherein said hinge plates and said side plates are connected into a caterpillar type belt.

26. The filtering system according to claim 25, wherein the primary filtered coolant is coolant where curled cuttings and dumpling cuttings as lumps of the curled cuttings have been removed, and wherein said hinge plates have a plurality of through holes of a size which does not pass the curled cuttings and dumpling cuttings.

27. The filtering system according to claim 26, wherein the secondary filtered coolant is coolant where sludge type cuttings smaller than the curled cuttings and dumpling cuttings have been removed.

28. The filtering system according to claim 27, wherein the used coolant is cutting oil.

29. The filtering system according to claim 19, wherein in said first filtering apparatus main body, a wastes remover is provided at a position around said second opening and close to an orbital path of said scrapers so as to remove the wastes entangled to said scrapers and collide with said scrapers, and wherein in said first filtering apparatus, a liquid trap plate which traps the primary filtered coolant, dropping from said conveyor, is provided at a position below said wastes remover and around said second opening.

30. The filtering system according to claim 29, wherein said hinge-belt has a plurality of hinge plates connected with each other and a plurality of side plates provided on edges of said hinge plates, and wherein said hinge plates and said side plates are connected into a caterpillar type belt.

31. The filtering system according to claim 30, wherein the primary filtered coolant is coolant where curled cuttings and dumpling cuttings as lumps of the curled cuttings have been removed, and wherein said hinge plates have a plurality of through holes of a size which does not pass the curled cuttings and dumpling cuttings.

32. The filtering system according to claim 31, wherein the secondary filtered coolant is coolant where sludge type cuttings smaller than the curled cuttings and dumpling cuttings have been removed.

33. The filtering system according to claim 32, wherein the used coolant is cutting oil.

34. The filtering system according to claim 19, wherein said hinge-belt has a plurality of hinge plates connected with each other and a plurality of side plates provided on edges of said hinge plates, and wherein said hinge plates and said side plates are connected into a caterpillar type belt.

35. The filtering system according to claim 34, wherein the primary filtered coolant is coolant where curled cuttings and dumpling cuttings as lumps of the curled cuttings have been removed, and wherein said hinge plates have a plurality of through holes of a size which does not pass the curled cuttings and dumpling cuttings.

36. The filtering system according to claim 35, wherein the secondary filtered coolant is coolant where sludge type cuttings smaller than the curled cuttings and dumpling cuttings have been removed.

37. The filtering system according to claim 36, wherein the used coolant is cutting oil.

38. The filtering system according to claim 20, wherein the used coolant is cutting oil.

39. The filtering system according to claim 16, wherein the used coolant is cutting oil.

40. The filtering system according to claim 16, wherein said hinge-belt has a plurality of hinge plates connected with each other and a plurality of side plates provided on edges of said hinge plates, and wherein said hinge plates and said side plates are connected into a caterpillar type belt.

41. The filtering system according to claim 40, wherein the primary filtered coolant is coolant where curled cuttings and dumpling cuttings as lumps of the curled cuttings have been removed, and wherein said hinge plates have a plurality of through holes of a size which does not pass the curled cuttings and dumpling cuttings.

42. The filtering system according to claim 41, wherein the secondary filtered coolant is coolant where sludge type cuttings smaller than the curled cuttings and dumpling cuttings have been removed.

43. The filtering system according to claim 42, wherein the used coolant is cutting oil.

* * * * *